United States Patent
Griswold et al.

[11] Patent Number: 5,769,363
[45] Date of Patent: Jun. 23, 1998

[54] AIRCRAFT ADJUSTABLE CONTROL STICK

[75] Inventors: Douglas A. Griswold; John I. Friesen, Jr., both of Wichita, Kans.

[73] Assignee: The Cessna Aircraft Company, Wichita, Kans.

[21] Appl. No.: 550,556

[22] Filed: Oct. 31, 1995

[51] Int. Cl.⁶ .................................................. B64C 13/04
[52] U.S. Cl. ............................ 244/234; 74/557; 74/523; 74/553
[58] Field of Search ................................. 244/234, 236; 74/557, 528, 523, 553, 543, 545

[56] References Cited

U.S. PATENT DOCUMENTS

| | | | |
|---|---|---|---|
| 2,395,728 | 2/1946 | Dodson | 244/234 |
| 2,396,309 | 3/1946 | Wodal | 244/234 |
| 2,427,962 | 9/1947 | Gwinn | 244/234 |
| 3,086,407 | 4/1963 | Reese | 74/528 |
| 4,114,843 | 9/1978 | Robinson | 74/543 |
| 4,811,921 | 3/1989 | Whitaker et al. | 244/234 |
| 4,819,896 | 4/1989 | Narad | 244/234 |

*Primary Examiner*—Andres Kashnikow
*Assistant Examiner*—Tien Dinh
*Attorney, Agent, or Firm*—Edward L. Brown, Jr.

[57] ABSTRACT

An adjustable aircraft control stick comprising a vertically-positioned column pivoted about the pitch axis for controlling the elevators and a yoke member pivotally mounted to the upper end of the control column about an axis parallel to the roll axis of the aircraft for control of the ailerons. The yoke member including a series of socket openings positioned longitudinally on the yoke and a hand grip member releasably engageable with any of said sockets to adjust for different arm length pilots.

8 Claims, 2 Drawing Sheets

AIRCRAFT ADJUSTABLE CONTROL STICK

BACKGROUND OF THE INVENTION

Aircraft control sticks or columns operate about two perpendicular axes, the first being the pitch axis which causes the airplane to dive or climb and the second being the roll axis. To accommodate pilots of different arm and leg reach, some means of adjustment must be utilized. In civilian aircraft, accommodation of various arm and leg lengths can be made through adjustment of the seat up-and-down as well as back-and-forth. In military aircraft which employ ejection seats, back-and-forth seat adjustment is not a viable approach since the seat is mounted on a fixed rail for a vertical departure. With the pilot's seat fixed, it became necessary to provide adjustable positions on the control stick which would fit the arm of the pilot.

Adjustable control sticks have been previously taught in the art such as the patent to Rasmussen, U.S. Pat. No. 3,219,296, which teaches a hand-controller whereby pivot point of the hand controller is shiftable horizontally, fore and aft, to accommodate the pilot's arm length.

Another adjustable control stick is shown in the patent to Whitaker, U.S. Pat. No. 4,811,921, wherein the length of the stick is adjustable through a telescoping action to vary the height of the grip portion of the stick.

SUMMARY OF THE INVENTION

The present invention provides an adjustable control stick for military aircraft which adjusts not only in a fore and aft position but also allows vertical adjustment. Located on the end of a vertically-positioned control column is a yoke member which is pivotally mounted to the control column about an axis parallel to the roll axis of the aircraft. The yoke member includes a series of three sockets in the top surface thereof positioned longitudinally with the third or most remote socket to the pilot being elevated above the other two. The hand grip assembly includes a tapered oblong plug on the lower end thereof with a mating shape to that of the socket for engagement with any one of the three socket positioned. The hand grip is held in place by a retainer bolt which draws the tapered plug tightly into the mating socket so that there is no movement between the hand grip and the yoke.

It is therefore the principal object of the present invention to provide an adjustable control stick whereby the hand grip assembly can be adjustably positioned on the control column.

Another object of the present invention is to provide a new and improved adjustable grip assembly which provides both fore and aft as well as an elevated adjustment.

A further object of the present invention is to provide a socket and plug coupling mounting a hand grip to a control column which has correct angular alignment, high strength and no movement in the coupling.

The foregoing and other objects of the present invention will be more fully understood from the following description when read in conjunction with the accompanying drawings.

DESCRIPTION OF THE PREFERRED EMBODIMENTS

Figure 1:
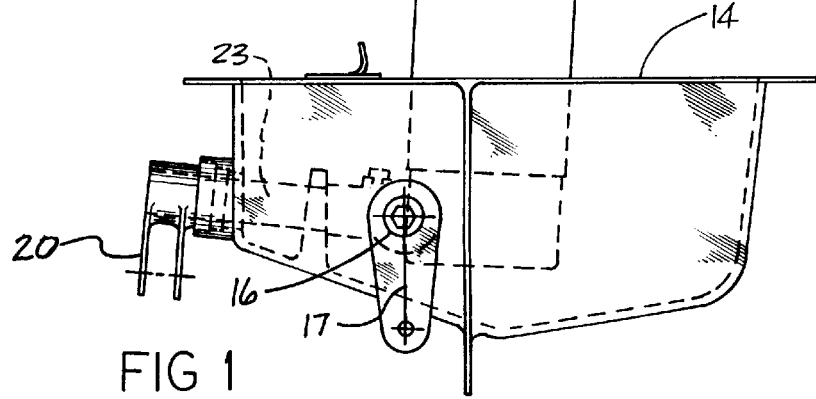
FIG. 1 is a side elevational view of the control column and grip assembly mounted in an aircraft with portions of the aircraft floor structure shown.

Referring more particularly to the drawings, FIG. 1 shows the aircraft adjustable control stick which is indicated in its entirety by the reference numeral 10. The stick 10 includes a control column 12 pivotally mounted at its lower end to the aircraft structure by pivot 16 which is the pitch axis of the aircraft. Pivotally attached to the upper end of column 12, about an axis perpendicular to the pitch axis, is a u-shaped yoke member 18 which rotates about an axis 21 through a shaft 19 to provide the roll control for the aircraft. Removably attached to the yoke 18 is a hand grip assembly 38 which engages any one of sockets 22, 24 or 26.

Movement of the control column fore and aft about pivot 16 provides pitch control for the aircraft by controlling the elevator movement through drive arm 17. The respective linkage in the aircraft between drive arm 17 and the control surfaces are not shown. This is also true for linkages connecting the ailerons to drive arm 20 through shaft 23. Located within control column 12 but not shown are a series of conventional bell cranks and arms which rotate drive arm 20 through the rotation of yoke 18 and shaft 19 about axis 21, to provide aileron movement.

Figure 2:
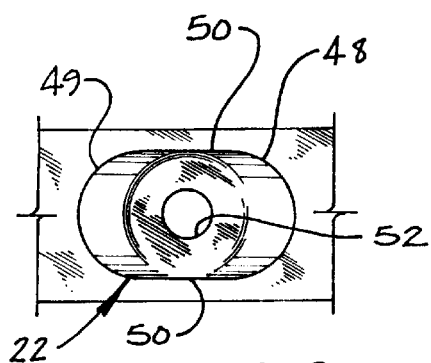
FIG. 2 is an enlarged fragmentary view taken along lines 2—2 of FIG. 1.
Figure 3:
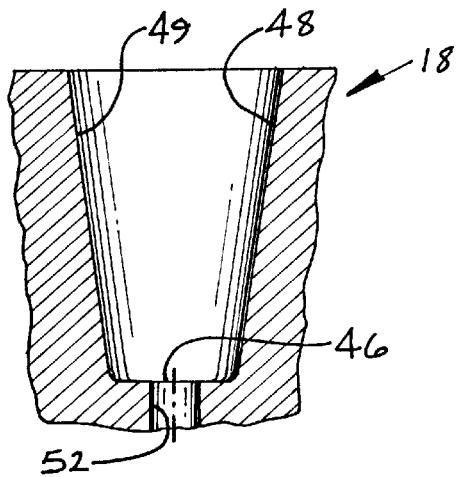
FIG. 3 is an enlarged fragmentary sectional view taken along lines 3—3 of FIG. 1.
Figure 4:
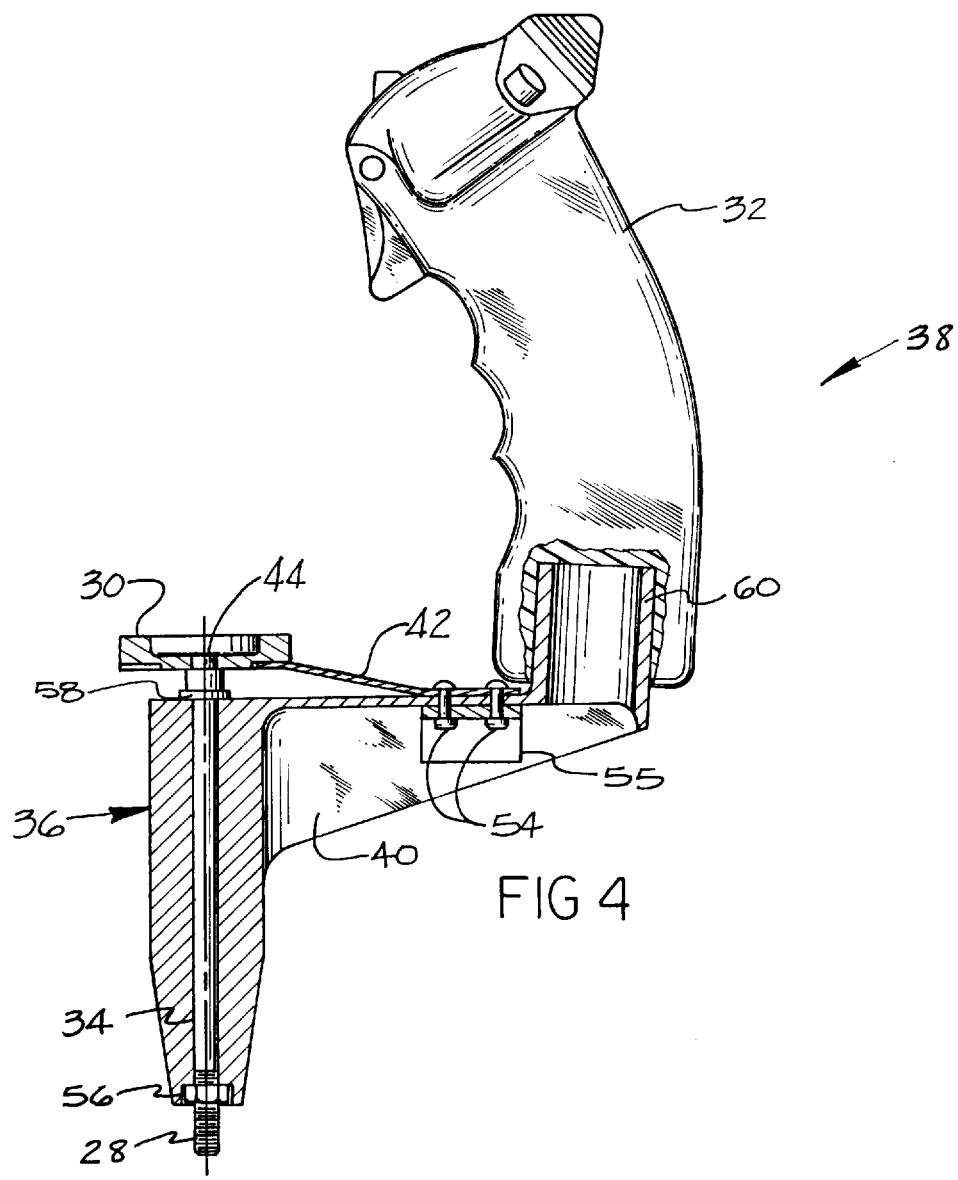
FIG. 4 is an enlarged side elevational view of the grip assembly.
Figure 5:
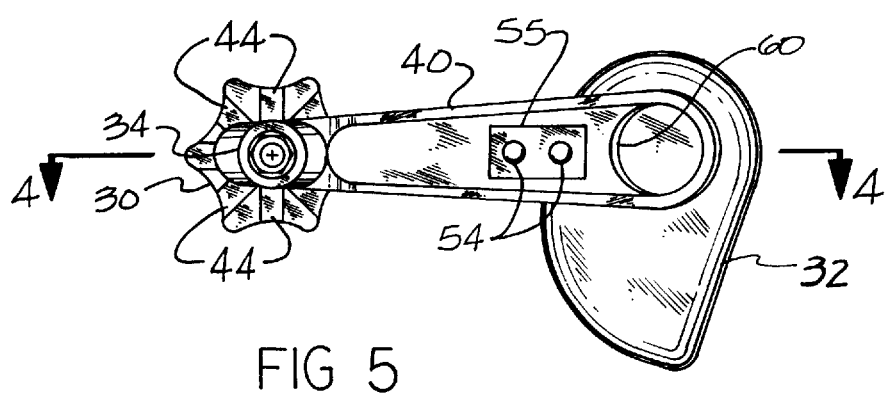
FIG. 5 is an enlarged bottom view of the grip assembly.

The sockets 22, 24 and 26 in yoke member 18 are illustrated in detail in FIGS. 2 and 3. Socket 22 at its bottom 46 is round in cross section with a concentric threaded hole 52 exiting therefrom. The sides of socket 22 which start out as half cylinders at the bottom 46 are skewed half cylinder surfaces 48 and 49 as viewed in FIG. 2 with straight sections 50 located therebetween. The cross-sectional shape of the socket changes from a circle at the bottom to an oblong shape at the top, as seen in FIG. 2. The socket 22 has an identical shape to the tapered plug 34 which forms the end of hand grip assembly 38. Assembly 38 includes a hand grip 32 which mounts on the end of a casting 36 which is shown in detail in FIGS. 4 and 5. Casting 36 includes a hollow cantilevered arm 40 with a post 60 which attaches to hand grip 32. The remaining portion of casting 36 is a tapered plug 34 having a concentric bore 35 therein for receipt of retainer bolt 28. Located on the upper end of bolt 28 is a washer 58 and fluted knob 30 for manually engaging or releasing the hand grip assembly 38 to the yoke. Fluted knob 30 includes a series of radial notches 44 on the underside thereof which are engaged, when properly positioned, by the end of locking spring 42. Located on the lower extremities of bolt 28 is a press fitted retaining ring 56.

To adjust the hand grip assembly on the control stick, locking spring 42 is depressed releasing notch 44 on knob 38 and the knob is manually unscrewed until retainer bolt 28 is released from threaded hole 52. With the taper angle between sides 48 and 49 being over 15°, the tapered plug 34 is easily removed from its socket. By reason of the oblong cross section of the tapered plug, the hand grip 32 when inserted in a different socket will be correctly positioned angularly by reason of the mating oblong surfaces and as the parts are tightly drawn together by retainer bolt 28, they form a high strength integral coupling with no play between the hand grip 32 and the yoke 18.

When the hand grip assembly 38 is placed in socket 26, the hand grip 32 is elevated as well as moved horizontally from the positions in sockets 22 and 24.

While the principals of the invention have been made clear in the illustrated embodiments, it will be obvious to those skilled in the art certain modifications of structure, material, and proportions used in the practice of the invention may be made without departing from those principals. The appended claims are therefore intended to cover and embrace any such modifications within the limits of the scope of the invention.

What we claim is:

1. In a manual controller for a steerable aircraft, an adjustable control column comprising:

a vertically positioned control column pivoted about the aircraft's pitch axis to the aircraft;

a yoke member pivotally mounted to the upper end of the control column about an axis parallel to the roll axis of the aircraft, the yoke member including a series of open sockets in the top surface thereof positioned longitudinally in line with the pivoting axis of the yoke;

a hand grip assembly including a plug on the lower end thereof with a mating shape with said sockets for engagement with any one of said sockets;

a retention member for removably engaging said plug to said yoke socket and anchoring the hand grip to the yoke in fixed relation to each other.

2. An adjustable control column, as set forth in claim 1, wherein the sockets and plug are shaped in a common oblong cross section whereby the angular position of the grip assembly with respect to the control column is the same regardless of the socket engaged.

3. An adjustable control column, as set forth in claim 1, wherein the sockets and plug are tapered.

4. An adjustable control column, as set forth in claim 1, wherein the sockets and plug are tapered and the retention member is a concentrically positioned bolt in said plug which engages said yoke.

5. An adjustable control column, as set forth in claim 1, wherein the sockets and plug have a non-circular common cross section.

6. An adjustable control column, as set forth in claim 1, wherein the sockets and plug are tapered and have a non-circular common cross section.

7. An adjustable control column, as set forth in claim 1, wherein said sockets are at different heights.

8. In a manual controller for a steerable aircraft, an adjustable control column comprising:

a vertically positioned control column pivoted only about the aircraft's pitch axis to the aircraft for controlling the elevators;

a yoke member pivotally mounted to the upper end of the control column about an axis parallel to the roll axis of the aircraft for control of the ailerons; and a single hand grip member releasably attached to said yoke member with sufficient angular movement to provide full aileron control.

* * * * *